July 11, 1967     A. H. MILNER ET AL     3,331,007
RECTANGULAR-WAVE TRANSDUCER
Filed May 11, 1964     8 Sheets-Sheet 1

INVENTORS
ARTHUR F. WOOD
ARTHUR H. MILNER
BY
ATTORNEY

INVENTORS
ARTHUR F. WOOD
ARTHUR H. MILNER
BY
ATTORNEY

July 11, 1967   A. H. MILNER ET AL   3,331,007
RECTANGULAR-WAVE TRANSDUCER

Filed May 11, 1964   8 Sheets-Sheet 3

INVENTORS
ARTHUR F. WOOD
ARTHUR H. MILNER
BY
ATTORNEY

July 11, 1967

A. H. MILNER ET AL 3,331,007

RECTANGULAR-WAVE TRANSDUCER

Filed May 11, 1964

INVENTORS
ARTHUR F. WOOD
ARTHUR H. MILNER
BY

ATTORNEY

July 11, 1967   A. H. MILNER ETAL   3,331,007
RECTANGULAR-WAVE TRANSDUCER
Filed May 11, 1964   8 Sheets-Sheet 5

INVENTORS
ARTHUR F. WOOD
ARTHUR H. MILNER
BY
ATTORNEY

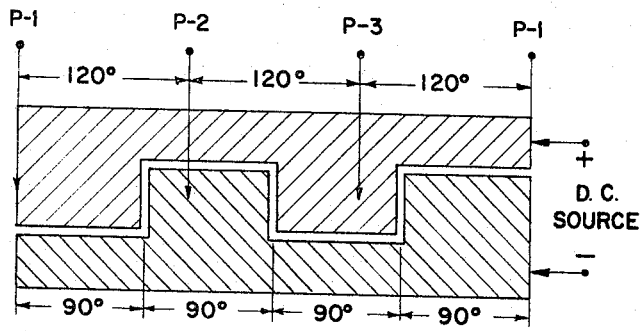
FIG. 14
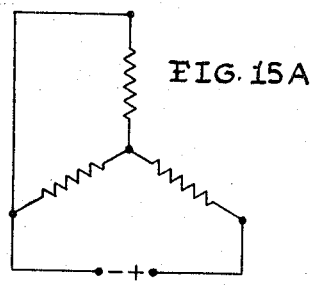
FIG. 15A
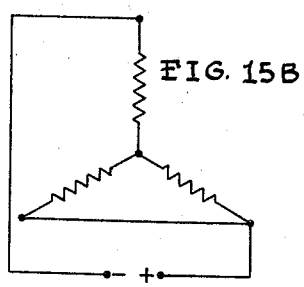
FIG. 15B
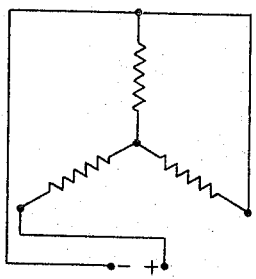
FIG. 15C
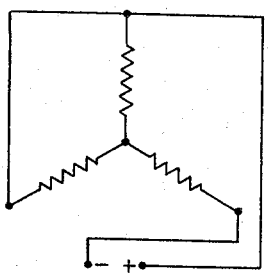
FIG. 15D
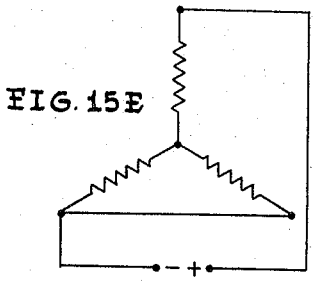
FIG. 15E
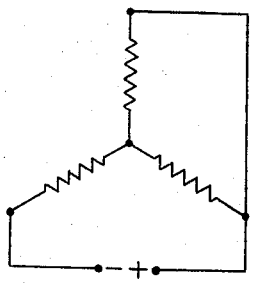
FIG. 15F
INVENTORS
ARTHUR F. WOOD
ARTHUR H. MILNER
BY
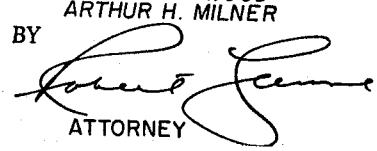
ATTORNEY July 11, 1967 A. H. MILNER ET AL 3,331,007
RECTANGULAR-WAVE TRANSDUCER
Filed May 11, 1964 8 Sheets-Sheet 7

INVENTORS
ARTHUR F. WOOD
ARTHUR H. MILNER
BY
ATTORNEY

July 11, 1967    A. H. MILNER ET AL    3,331,007
RECTANGULAR-WAVE TRANSDUCER
Filed May 11, 1964    8 Sheets-Sheet 8

INVENTORS
ARTHUR F. WOOD
ARTHUR H. MILNER
BY
ATTORNEY

United States Patent Office 3,331,007
Patented July 11, 1967

3,331,007
RECTANGULAR-WAVE TRANSDUCER
Arthur H. Milner and Arthur F. Wood, Indianapolis, Ind., assignors to P. R. Mallory & Co., Inc., Indianapolis, Ind., a corporation of Delaware
Filed May 11, 1964, Ser. No. 366,359
15 Claims. (Cl. 321—50)

ABSTRACT OF THE DISCLOSURE

A means and method for converting a DC input to a rectangular-wave AC output of a frequency determined by the speed by which the device is driven and the number of lobes or commutators on the transducer rotor. By making slight modifications in the terminal location, the output from the transducer will be quasi three-phase, and by coupling two such units togeher, output pulses or AC bursts may be obtained of a width relative to the angular displacement between the two coupled units.

---

This invention pertains to a transducer which will transform direct current (DC) to rectangular-wave alternating current (AC), both single phase and quasi 3-phase, and which can be used in tandem to convert AC or DC into corresponding pulse of adjustable width.

Various means of obtaining AC from DC are practiced, with varying degrees of satisfaction. For example, a DC motor may be equipped with slip rings and brushes to supply AC output. Or an alternator may be coupled to a DC motor to deliver AC output.

Likewise, static devices utilizing transistors will transform DC to rectangular-wave AC.

Choppers and vibrators are also used to make such transformations.

All these systems differ in degree of resultant satisfaction. Consider the DC motor with slip rings; the output current passes through the armature windings causing a power loss and reduced output voltage and corresponding decrease in efficiency.

A similar condition prevails in the alternator-motor case but with still lower efficiency as extra power is needed to excite the alternator field and to supply windage, bearing and coupling losses.

Transistor-type units are electrically entirely satisfactory but are relatively high-priced.

Choppers and vibrators are limited to operation at fixed frequencies and at comparatively low power levels.

Additional problems and expense are involved in obtaining some type of 3-phase output from any of the above systems or to obtain adjustable width pulses of AC or DC.

An object of this invention is to provide a small and low-cost transducer device, which, driven by some type of motor, will transform direct current (DC) input into rectangular-wave alternating current (AC) output.

Another object of this invention is to provide a simple means whereby a quasi 3-phase output is obtained.

A further object of this invention is to provide means whereby a number of units may be coupled together in tandem so that a number of independent outputs may be obtained.

Still another object of this invention is to provide means to adjust angularly such tandem units so as to obtain a phase displacement between outputs.

Yet another object of this invention is to provide means whereby two units in tandem are angularly adjustable to provide a series of output pulses of a width dependent on such angular displacement.

A further object of this invention is to provide a unit of great durability and power handling capacity, particularly by the use of a liquid-filled structure.

Another object of this invention is to simulate a switch up to a double pole-double throw which may be manually or mechanically operated.

A dominant object of this invention is to produce a device which is basically simple and economical to manufacture and which basic unit may be readily modified at low cost to provide all the various functions described heretofore.

There are many advantages which may be realized from the use of this invention. It has been found that with an input of 1–110 v. DC and with a rotor speed of 0–6000 r.p.m. that an output of 1–110 v. at 0–400 c.p.s. at 60 watts is obtainable. This is sufficient to drive small shaded-pole induction motors, reluctance motors, synchronous motors and hysteresis-type motors. Motor speeds may be varied by varying the speed of the transducer driver. This is much superior to reducing the output speed by adding resistance or reducing the voltage as the torque is also reduced in such cases. Because of the greater losses in the rotor of a hysteresis-type motor operated with a rectangular-wave input, the output torque may be expected to be greater than with sine wave operation.

Flasher lamps may be operated either as blinkers or alternate flashers at a speed limited, primarily, by the lamp characteristics.

Solenoids of all types may be operated at resonant conditions by varying the transducer output frequency to the point of greatest amplitude. Such solenoids can power jig saws, staking hammers, etc.

By using DC pulses or AC bursts, universal-motor driven tools may be operated at virtually any speed while delivering full torque output.

By making use of the quasi 3-phase transducer output, 3-phase motors may be driven directly or, the output may be used to trigger thyratrons or silicon controlled rectifiers to operate large motors rated over 50 watts.

The accompanying drawings illustrate several embodiments of the invention to indicate to some degree the various designs possible within the scope of this specification. This is not to be construed as limiting, but rather indicative of the variations possible on this theme. Consider the drawings forming part of this application and which are described in some detail below.

FIGURE 14 represents a developed view of a 4-lobe rotor with each of the slip ring portions connected respectively to the DC source and with output brushes spaced 120 degrees apart to provide a quasi 3-phase output.

FIGURE 15 illustrates the manner in which the DC input is progressively distributed across each section of the Y-connected load; two-thirds of the applied voltage appears across the right-hand load in A and, as the transducer shaft is turned counter-clockwise, that voltage progressively appears across the top load in B, the left-hand load in C, the right-hand load in D, the top load in E, and the left-hand load in F.

Figure 16:
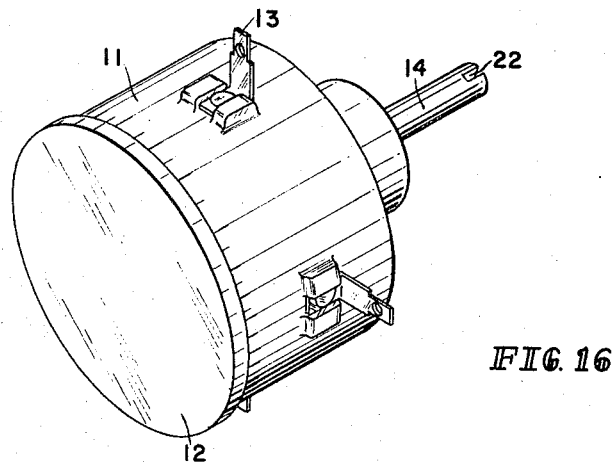

FIGURE 16 represents an alternate embodiment of this invention utilizing a molded plastic body.

Figures 17, 18:
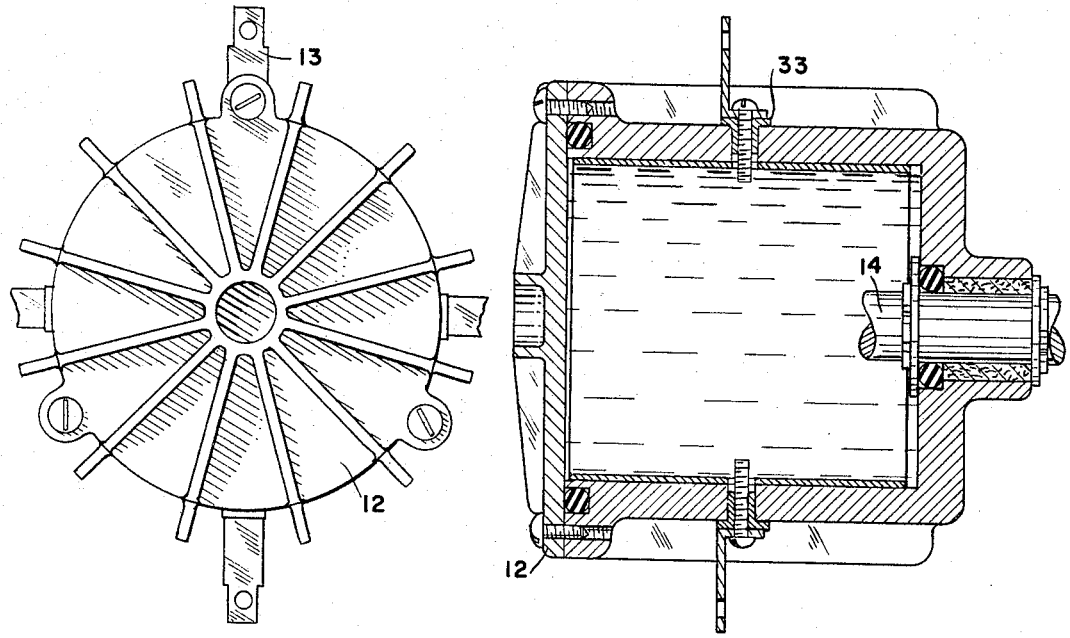

FIGURE 17 is the rear view of another embodiment of this invention incorporating heat-dissipating fins and a die-cast body.

FIGURE 18 is a sectional side view of the transducer pictured in FIGURE 17 showing the internal cavity filled with an insulating liquid and typical seals to prevent leakage.

Figure 19:
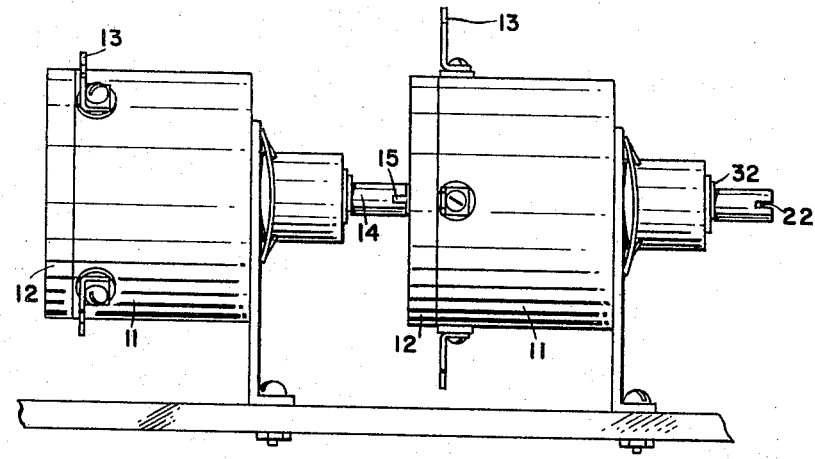

FIGURE 19 is a side view of two basic transducers coupled together and angularly displaced from one another by about 45 degrees.

Figure 20:
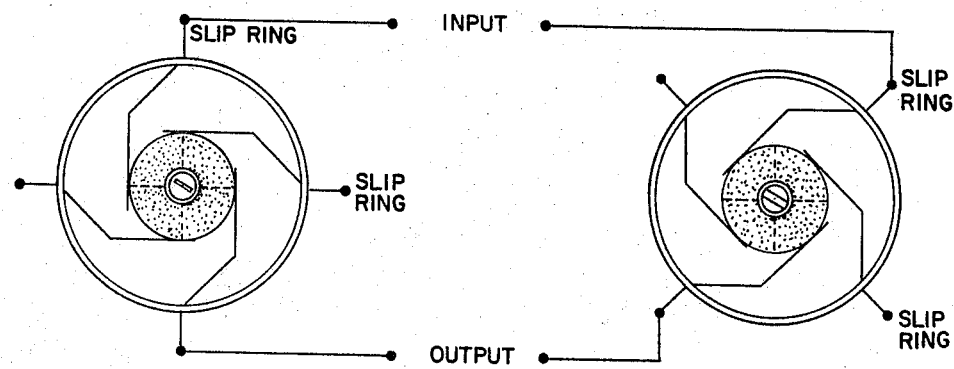

FIGURE 20 is a pictorial schematic wiring diagram of the units described in FIGURE 19.

Figure 21A:
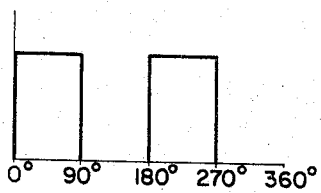
Figure 21B:
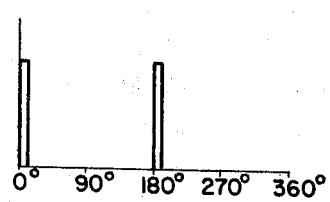
Figure 21C:
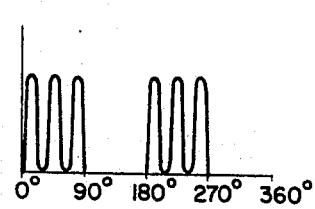

FIGURE 21 illustrates the various types of wave forms obtainable by various angular displacements of the two transducers; A and B illustrate typical direct current pulses of various widths while C illustrates a typical alternating current burst obtained from an alternating current input.

Generally speaking, the present invention comprises a method of converting a DC input to a rectangular-wave AC output of a frequency determined by the speed with which the device is driven and the number of lobes on the transducer rotor. By making slight modifications in terminal location, the output from the transducer will be quasi 3-phase, and by coupling two such units together, output pulses or AC bursts may be obtained of a width relative to the angular displacement between the two coupled units.

Figures 1, 2:
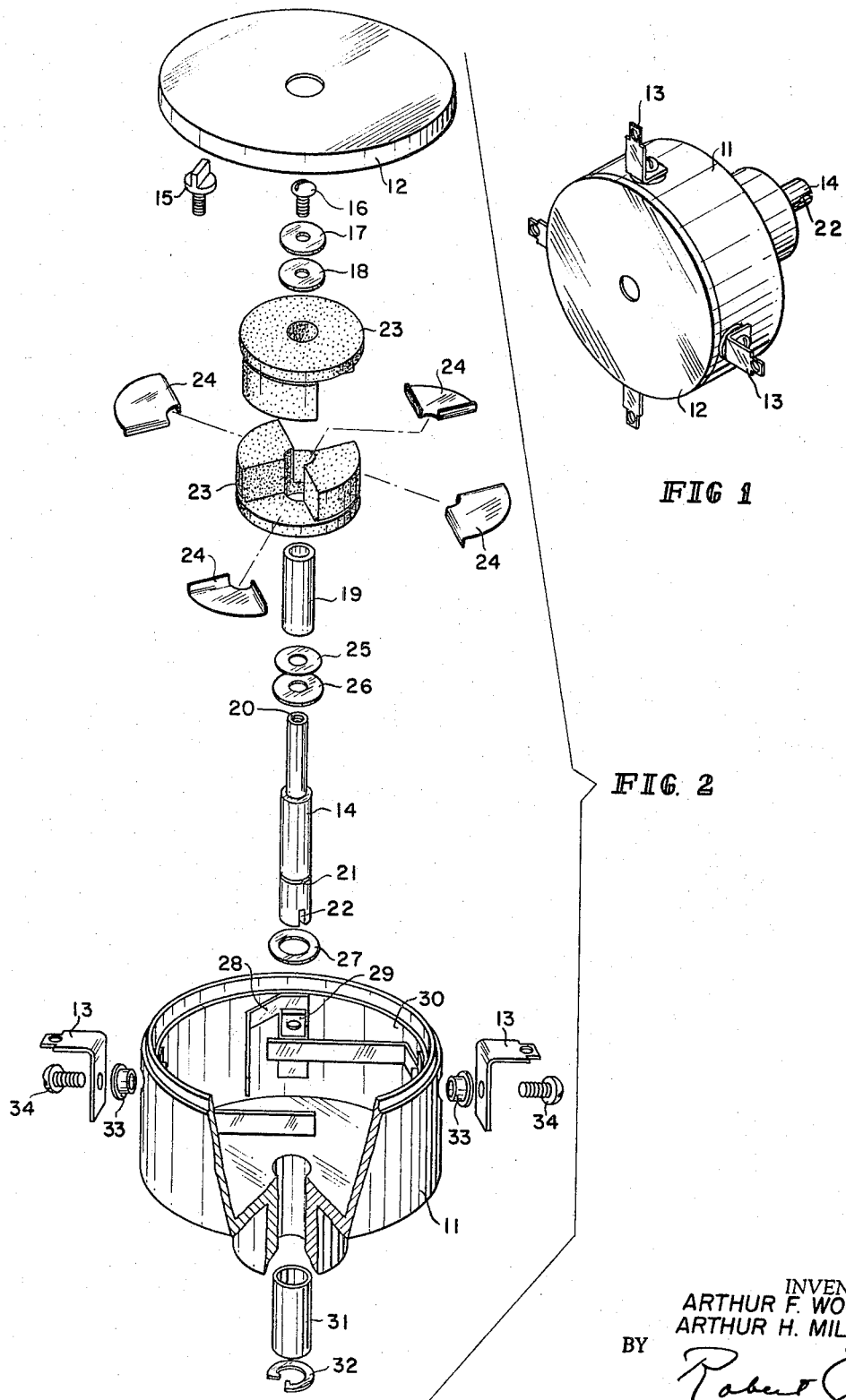
FIGURE 1 is an isometric view of the rear and side of the basic transducer incorporating a metal body.
FIGURE 2 is an exploded view of the basic transducer utilizing a 4-lobe rotor.

Referring again to the drawings forming part of this application, FIGURE 1 is a view of the complete transducer while FIGURE 2 is an exploded view showing in detail all the parts comprising the complete transducer.

The body 11 is a die-cast shell with a bushing cast integrally on the closed face and through which is force-fitted the sleeve bearing 31 so it is flush with the outside end of the bushing. Insulating strip 30, which may be laminated phenolic material, fits inside the body 11 so the holes in the strip are all in alignment with the holes in the body. Terminal screw 34, made of some low resistance metal such as a copper alloy, is inserted through the hole in terminal 13, which is commonly called a "spade" or "quick-disconnect" type terminal. Insulating bushing 33, which may be molded of a polycarbonate plastic, is inserted into a hole in the side of the body and the terminal-terminal screw inserted into the insulating bushing. Contact spring 28, which may be of a copper or silver base and spring tempered, is placed over the end of the screw within the body and nut 29 is then screwed onto the end of the terminal screw and the screw tightened to hold the stack securely. The contact springs are adjustable as they are provided with slotted holes so the same springs can be used in any position within the body.

The other 3 holes have springs and terminals attached in the same manner.

The rotor is assembled by placing a metal washer 26 over the reduced diameter of shaft 14, which may be made of plated steel, and butting it against the shoulder. An insulating washer 25, which may be made of laminated phenolic, is then dropped onto the shaft next to the metal washer. An insulating tube 19 is slipped over the shaft, butting against the insulating washer. A rotor segment 23, molded of carbon-graphite, with the flat side down, is slipped over the shaft so it butts against the insulating washer. A rotor segment insulator 24 is placed in each cavity of the rotor segment with the upturned edges directed upwards and also on top of each plateau with the upturned edges extending downward. The second rotor segment is then slipped over the shaft with the flat side upward and turned so that the lobes nest in opposing cavities and the upturned edges of the rotor segment insulators are fitted into the radial slots existent between the adjoining faces of the two rotor segments. The end of the insulating tube should be slightly below the face of the rotor segment. An insulating washer 18, similar to 25 except for a smaller hole, is placed on the shaft and butts against the side of the rotor segment. A metal washer 17, similar to 26 except for a smaller hole, is slipped over the end of the shaft. Shaft screw 16 is screwed into the tapped hole 20 in the end of the shaft thus compressing axially all items assembled thereon.

This rotor asesmbly is inserted into the open end of the body so the shaft enters the hole in the sleeve bearing; the contact springs must be deflected outwardly so the rotor can be placed in position. Thrust washer 27 is slipped over the shaft against the end of the sleeve bearing and lock ring 32 is clinched into groove 21 and cover 12 is friction-fitted to the open end of the body. The completed unit is pictured in FIGURE 1.

If two units are to be used in tandem, then the front driving unit will be assembled with a tang screw 15 in place of the shaft screw 16. The tang fits into the slotted shaft of the rear unit as illustrated in FIGURE 19.

Figure 3:
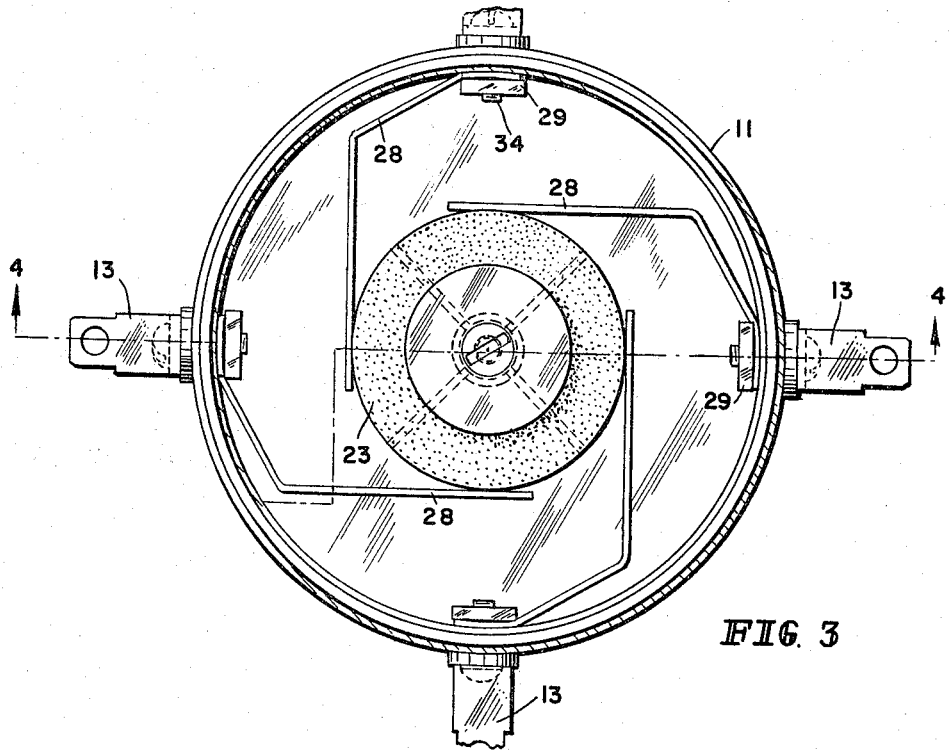
FIGURE 3 is a rear view of the assembled transducer shown in FIGURE 2 but with the cover removed.
Figure 4:
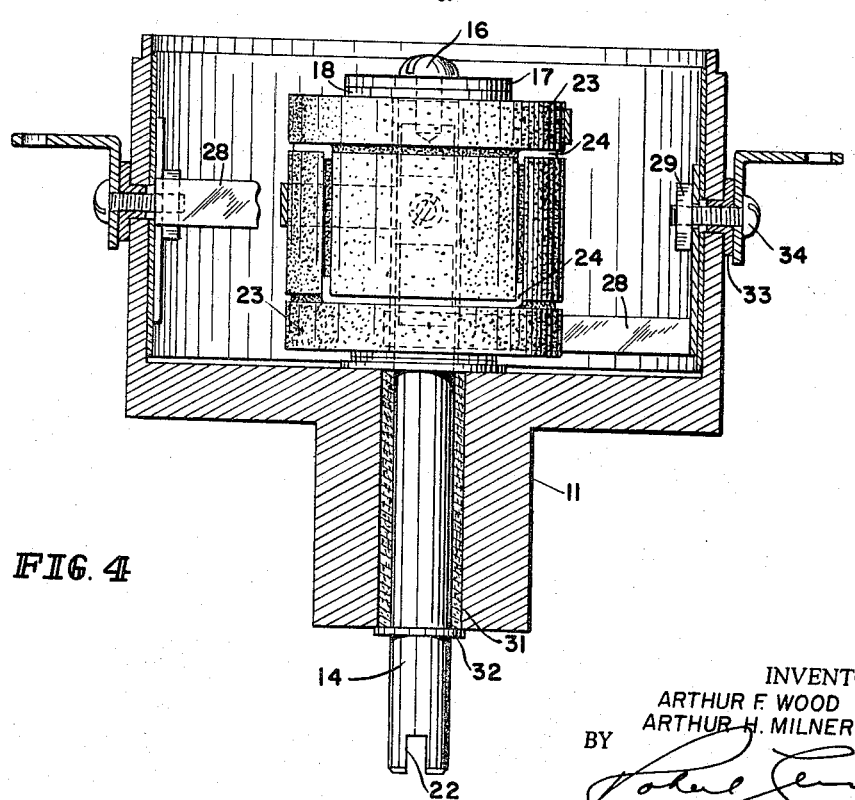
FIGURE 4 is a sectional view of the transducer in accordance with the section lines shown in FIGURE 3.
Figure 5:
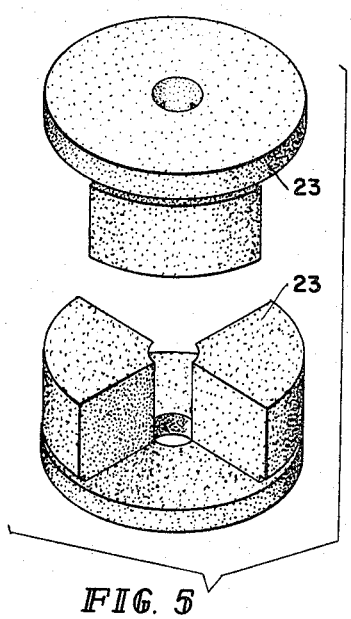
FIGURE 5 illustrates identical 2-lobe segments which nest together to form a 4-lobe rotor with each half insulated from the other.

The operation of this transducer in converting DC to rectangular-wave AC is as follows:

FIGURE 3 shows a 4-lobe rotor in contact with 4 contacts the right terminal contact spring stays in continuous contact with the left rotor lobe. The left terminal contact spring makes contact with the bottom rotor lobe. The bottom terminal contact spring makes continuous contact with the slip-ring portion of the top rotor segment while the right terminal contact spring stays in continuousu contact with the slip-ring portion of the bottom rotor segment. If a DC input is connected to the slip rings (bottom and right terminals), a corresponding output voltage will appear across the other two terminals. When the rotor is turned 45° from the position shown in FIGURE 3, the springs connected to the output terminals will bridge the gap between adjacent lobes, momentarily short-circuiting them. If the rotor is turned a few degrees farther in the same direction, the output contact springs will contact the adjacent lobes and the voltage across the output terminals will be of opposite polarity. This voltage reversal takes place each time the contact springs traverse a rotor gap. Thus 4 reversals take place for each complete 360° rotation of the rotor or 2 cycles per revolution. If the rotor is driven at 3600 r.p.m., then the output frequency would be $$\frac{2 \times 3600}{60}$$

or 120 c.p.s.

Figure 6:
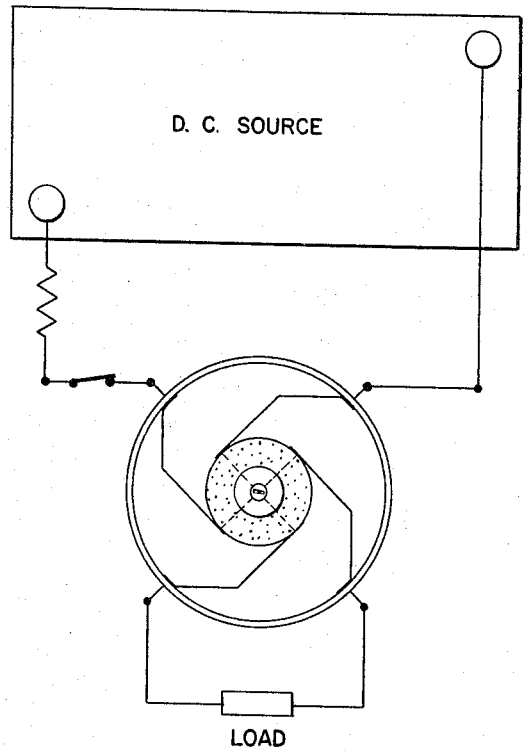
FIGURE 6 is a semi-pictorial circuit diagram of the transducer with the motor shown in FIGURE 5 connected to a DC source, a limiting resistor, an "on-off" switch, and a load.
Figure 7:
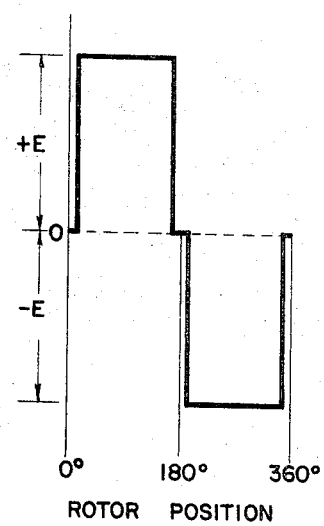
FIGURE 7 is a graph of the amplitude and waveform appearing across the load when the 4-lobe transducer shaft is rotated 360 degrees.

The input and output terminals may be interchanged without affecting the operation of the transducer; FIGURE 6 is a pictorial schematic of such an arrangement. FIGURE 7 depicts the wave form across the load; E is the value of impressed voltage and, consequently, the amplitude of the output voltage. The output voltage drops to zero for a few degrees as the contact springs bridge across the rotor gaps and although the rotor resistance is enough to limit the current at low voltage, a limiting resistor must be added in series with the DC supply as shown in FIGURE 6 to keep teh current to a safe value. With a load and limiting resistor connected to the transducer and power supply, the output voltage will be reduced by the voltage drop across the limiting resistor.

Figure 8:
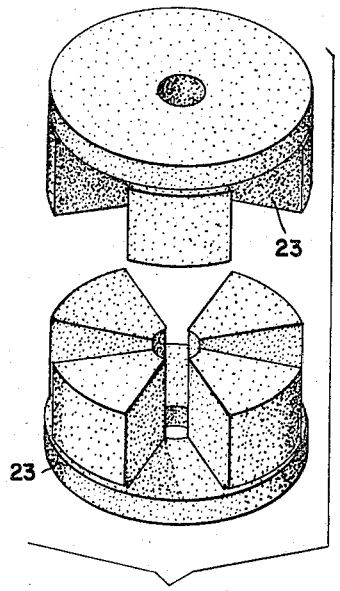
FIGURE 8 illustrates duplicate 4-lobe rotors which, nested together, form an 8-lobe rotor with each half insulated from the other half.
Figure 9:
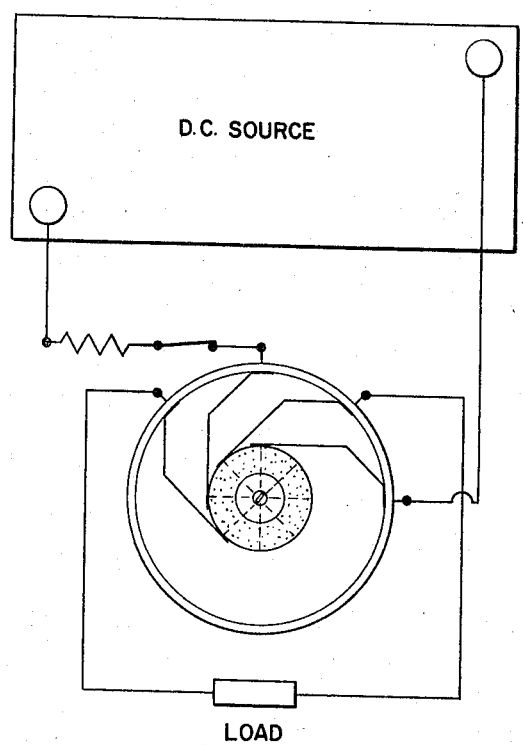
FIGURE 9 is a semi-pictorial schematic wiring diagram of the transducer with an 8-lobe rotor connected to a DC source, a limiting resistor, an "on-off" switch and a load.
Figure 10:
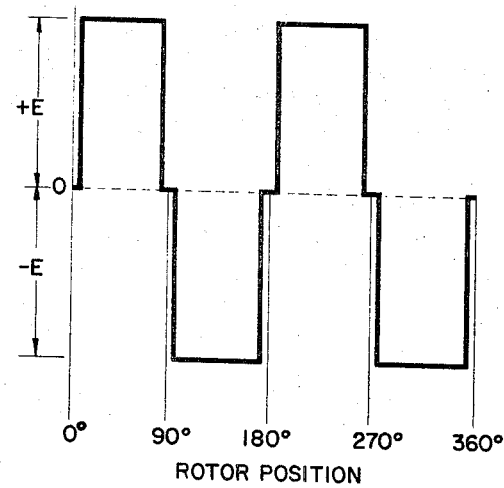
FIGURE 10 is a graph of the amplitude and wave shape appearing across the load as the 8-lobe rotor is turned 360 degrees.

The 4-lobe segments that make up the 8-lobe rotor are shown in FIGURE 8 and the schematic circuit diagram of application is shown in FIGURE 9. The position of the slip ring contact springs is unimportant as they remain in contact at all times. The other two terminals must be angularly spaced some odd multiple of 45°. The wave form obtained is shown in FIGURE 10. It should be noted that the transitional switching time is the same as for the 4-lobe rotor but as the "on" time for the latter is about twice as long, the percent "off" time is half as long as for the 8-lobe rotor.

Figure 11:
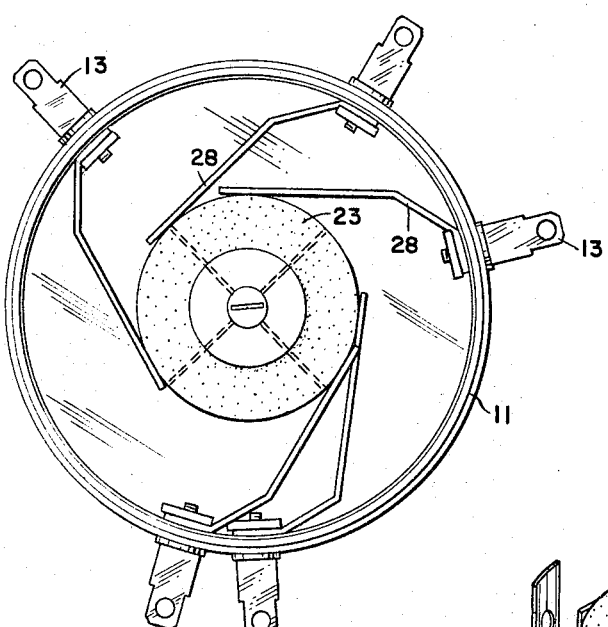
FIGURE 11 is a rear view of a quasi 3-phase transducer with a 4-lobe rotor and without a cover.
Figure 12:
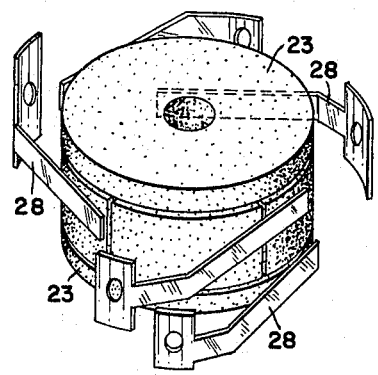
FIGURE 12 is a pictorial view of the motor and contact springs in the same position as depicted in FIGURE 11.
Figure 13:
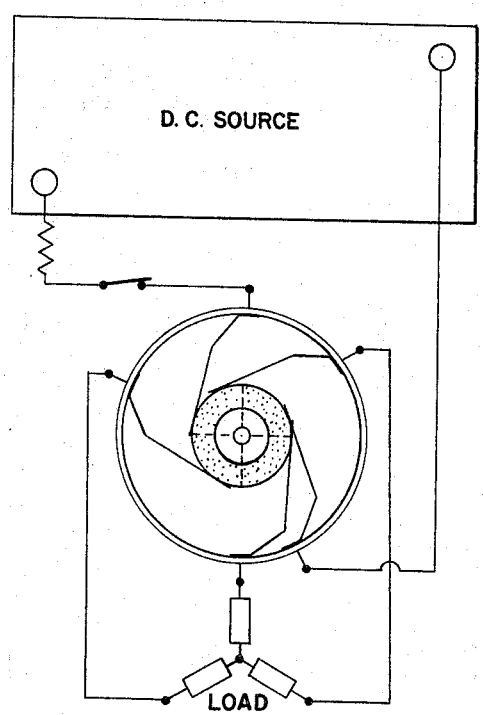
FIGURE 13 is a semi-pictorial circuit diagram of a quasi 3-phase transducer with a 4-lobe rotor connected to a DC source, a limiting resistor, an "on-off" switch and a load of Y configuration.

By spacing the contact springs 120° apart, as shown in FIGURES 11 and 12 and connecting the transducer to a DC source and a Y load as shown in FIGURE 13, a quasi-3-phase output may be obtained. FIGURE 14 is a developed view of the contact faces of the 4-lobe rotor with the contact springs labelled P–1, P–2, and P–3. The arrows at the ends of the contact spring indicate points of contact to the rotor. Contact to the slip rings is shown as a continuous connection to the DC source. The schematic diagram of FIGURE 15 indicates the manner in which the DC is switched across the Y load as the transducer shaft is turned counter-clockwise. Table I lists the polarity of the 3 output terminals at various rotor positions. This tabulation shows clearly the rotating field effect responsible for the quasi 3-phase designation. As the output is phased, it is possible to drive synchronous motors in any direction by turning the rotor in that direction.

TABLE I

| Rotor Position, degrees | Polarity | | |
|---|---|---|---|
| | P-1 | P-2 | P-3 |
| 0 | 0 | − | + |
| 5 | − | − | + |
| 25 | − | − | + |
| 30 | − | 0 | + |
| 35 | − | + | + |
| 55 | − | + | + |
| 60 | − | + | + |
| 65 | − | + | 0 |
| 85 | − | + | − |
| 90 | 0 | + | − |
| 95 | + | + | − |
| 115 | + | + | − |
| 120 | + | 0 | − |
| 125 | + | − | − |
| 145 | + | − | − |
| 150 | + | − | 0 |
| 155 | + | − | + |
| 175 | + | − | + |
| 180 | 0 | − | + |

Note.—("+"=Positive; "−"=Negative; "0"=Transitional).

5–85°, P–1 (−)    35–115°, P–2 (+)    65–145°, P–3 (−)
95–175°, P–1 (+)   125– 25°, P–2 (−)   155– 55°, P–3 (+)

Two or more transducers may be mounted in tandem so that the tang protruding from the rear of the unit fits into a notch in the front shaft of the rear unit. This makes it possible to obtain as many electrical outputs as there are units but only requires a single driving means. The outputs may be all phased together, or in any sequence, by rotating the body of the transducer to obtain the desired relationship.

It is also possible with two units to obtain pulses of output voltage by connecting the components as shown in FIGURE 20; the width of the pulses may be varied by rotating one body with respect to the other.

FIGURE 21 illustrates pulse patterns obtainable. The full width pulse shown at (A) can also be obtained with a single transducer using one slip ring terminal and one commutating terminal connected in series with a power supply and load. If a narrower width is needed, such as shown in (B), however, two transducers must be used.

The input may be line frequency AC which will result in an output consisting of a series of AC bursts as shown in (C).

There are some advantages to other embodiments of this transducer. If a plastic molded body is used as shown in FIGURE 16, the problem of insulating the terminals from the body is nonexistent, the insulating strip 30 is no longer required and neither are the four insulating bushings 33. Ribs forming an integral part of the body may be molded both inside and outside the body adjacent to the terminal holes, to key the ends of the contact springs and terminals so that they are held firmly in position and cannot be twisted sideways. The sleeve bearing 31 may be omitted by decreasing the hole diameter in the bushing end of the body 11 to obtain a running fit with the shaft 14.

A high power embodiment is shown in FIGURES 17 and 18. In this version, the body and cover may consist of die-castings with integrally cast fins to dissipate the heat generated at the rotor contacts. The body and cover are sealed liquid tight by a gasket or O ring as shown in FIGURE 17. The shaft may be sealed by use of a bronze-carbon ring seal or, as shown in FIGURE 17, by an O ring. The interior of the transducer is filled with an insulating liquid of low viscosity and good thermal conductivity such as one of the silicone family of fluids.

Particular advantages of this construction are greater power dissipation, quenching of sparking at contact surfaces, mechanical damping of contact spring vibration and continuous lubrication of rubbing surfaces.

For tandem operation, the front unit may be made with a grooved tang screw terminating the rotor assembly; the groove is snugly fitted with an O ring which is nested into a shallow recess, similar to the front end of the shaft, and slightly compressed. The cover must be made with a center opening of a diameter to clear the diameter of the tang screw.

Having revealed the design of this transducer and having explained the assembly and functions of its parts, the following claims are made:

1. In combination with a source of unidirectional current and a driving means, a transducer comprising a tubular body with one end closed by a flange of a coaxial, outwardly projecting, cylindrical bushing surrounding a sleeve bearing in which a rotatable shaft is disposed so that one end of the shaft projects beyond the outer end of the bushing, the other end of said shaft, enclosed within the body cavity, has insulatingly mounted thereon first and second slip rings with a commutator axially disposed between them, alternate bars of the commutator connected to said first slip ring, remaining bars connected to said second slip ring, free end of a first cantilever spring making contact to the surface of said first slip ring, free end of a second cantilever spring making contact with said second slip ring, said first and second cantilever springs connected to said unidirectional current source, a third cantilever spring making contact with a commutator bar, a fourth cantilever spring making contact with an adjacent commutator bar, points of contact of said third and said fourth contact springs being spaced 360° divided by the total number of commutator bars, the resulting current rectangularly-shaped and of a frequency proportional to speed of said driving means.

2. In combination with a source of unidirectional current and driving means, a transducer comprising a tubular body with one end closed by the flange of a coaxial, outwardly projecting, cylindrical bushing surrounding a sleeve bearing in which a rotatable shaft is disposed so that one end of said shaft projects beyond the outer end of said bushing, the other end of said shaft, enclosed within the body cavity, having insulatingly mounted thereon first and second slip rings with a commutator axially disposed between them, alternate bars of said commutator connected to a first slip ring, remaining bars of said commutator connected to said second slip ring, a free end of said first cantilever spring making contact with said first slip ring, free end of said second cantilever spring making contact with said second slip ring, first and second cantilever springs connected to said unidirectional current source, third, fourth, and fifth cantilever springs contacting said commutator at points spaced 120° resulting in a quasi 3-phase rectangular wave output of a frequency proportional to the speed of the aforementioned driving means.

3. In combination with a source of unidirectional current and a driving means, a transducer comprising a tubular body molded of rugged plastic, one end of said body closed by an integrally molded flange and outwardly projecting bushing, said bushing provided with a coaxial aperture in which a rotatable shaft is disposed so that one end of said shaft projects beyond the outer end of said bushing, the end of said shaft enclosed within the body cavity has insulatingly mounted thereon first and second slip rings with a commutator axially disposed between them, alternate bars of said commutator connected to said first slip ring, remaining bars connected to said second slip ring, free end of a first cantilever spring making contact to the surface of said first slip ring, free end of a second cantilever spring making contact with said second slip ring, said first and second cantilever springs connected to said unidirectional current source, a third cantilever spring making contact with a commutator bar, a fourth cantilever spring making contact with an adjacent commutator bar, points of contact of said third and fourth contact springs spaced 360° divided by total number of commutator bars, resulting in a rectangularly-shaped output current of a frequency proportional to speed of said driving means.

4. In combination with a source of unidirectional current and a driving means, a transducer comprising a tubular body molded of rugged plastic, one end of said body closed by an integrally molded flange and outwardly projecting tubular bushing, said bushing provided with a coaxial aperture in which a rotatable shaft is disposed so that one end of said shaft projects beyond the outer end of said bushing, other end of said shaft, enclosed within the body cavity, having insulatingly mounted thereon first and second slip rings with a commutator axially disposed between, alternate bars of said commutator connected to said second slip ring, free end of said first cantilever spring making slideable contact with said first slip ring, free end of said second cantilever spring making slideable contact with said second slip ring, said source of unidirectional current connected to said slip rings, third, fourth, and fifth cantilever springs contacting said commutator at points spaced 120°, resulting output current being rectangular in shape, quasi 3-phase in nature, and of a frequency proportional to the speed of said driving means.

5. In combination with a source of unidirectional current and a driving means, a transducer comprising a tubular body with a multiplicity of integral radial fins on the outer surface, one end of said body closed by an integral flange of a coaxial outwardly projecting tubular bushing surrounding a sleeve bearing in which a rotatable shaft is disposed so that one end of said shaft projects beyond the outer end of the bushing, the other end of the shaft, enclosed within said body cavity, has insulatingly mounted thereon first and second slip rings with a commutator axially disposed between, alternate bars of said commutator connected to said first slip ring and the remaining bars connected to said second slip ring, the free end of a first cantilever spring making slidable contact with said first slip ring, free end of a second cantilever spring making slideable contact with said second slip ring, said source of unidirectional current connected to said first and second slip rings, a third cantilever spring making contact with a commutator bar and a fourth cantilever spring making contact with an adjacent commutator bar, points of contact of said third and fourth cantilever springs spaced 360° divided by the total number of commutator bars, output current resulting being rectangular in shape, and of a frequency proportional to the speed of said driving means.

6. In combination with a source of unidirectional current and a driving means, a transducer comprising a tubular body with a multiplicity of integral radial fins on the outer surface, one end of said body closed by an integral flange of a coaxial outwardly projecting tubular bushing surrounding a sleeve bearing in which a rotatable shaft is disposed so that one end of said shaft projects beyond the outer end of the bushing, the other end of said shaft, enclosed within the body cavity, having insulatingly mounted thereon first and second slip rings with a commutator axially disposed between them, alternate bars of said commutator connected to said first slip ring, remaining bars connected to said second slip ring, the free end of a first cantilever spring making slideable contact with said first slip ring, the free end of a second cantilever spring making slideable contact with said second slip ring, said source of unidirectional current connected to said slip rings, third, fourth and fifth cantilever springs contacting said commutator at points spaced 120°, output current resulting being rectangular in shape, quasi 3-phase in nature, and of a frequency proportional to the speed of said driving means.

7. In combination with a source of unidirectional current and driving means, a transducer comprising a tubular body with a multiplicity of integral radial fins on the outer surface, one end of said body closed by an integral flange of a coaxial outwardly projecting tubular bushing surrounding a sleeve bearing in which a rotatable shaft is disposed so that one end of said shaft projects beyond the outer end of said bushing, the other end of said shaft, enclosed within said body cavity, having insulatingly mounted thereon first and second slip rings with a commutator axially disposed between, alternate bars of said commutator connected to said first slip ring, remaining bars connected to said second slip ring, free end of a first cantilever spring making contact with said first slip ring, free end of a second cantilever spring making contact with said second slip ring, said unidirectional current source connected to said first and second slip rings, a third cantilever spring making contact with a commutator bar, a fourth cantilever spring making contact with an adjacent commutator bar, points of contact of said third and fourth contact springs spaced 360° divided by total number of said commutator bars, said rotatable shaft sealed at inside bearing ends, said body cavity substantially filled with a low viscosity insulating fluid, resulting output current rectangularly-shaped and of a frequency proportional to speed of said driving means.

8. In combination with a source of unidirectional current and a driving means, a transducer comprising a tubular body with a multiplicity of integral radial fins on the outer surface, one end of said body closed by an integral flange of a coaxial outwardly projecting tubular bushing surrounding a sleeve bearing in which a rotatable shaft is disposed so that one end of said shaft projects beyond the outer end of said bushing, the other end of said shaft, enclosed within the body cavity, insulatingly mounted thereon first and second slip rings with a commutator axially disposed between, alternate bars of said commutator connected to said first slip ring, remaining bars connected to said second slip ring, a free end of first cantilever spring making contact with said first slip ring, free end of a second cantilever spring making contact with said second slip ring, said unidirectional current source connected to said slip rings, free ends of third, fourth, and fifth cantilever springs contacting said commutator at points spaced 120°, said rotatable shaft sealed at inside bearing end, cavity within said body substantially filled with a low-viscosity insulating fluid, output current resulting being rectangular in shape, quasi 3-phase in nature, and of a frequency proportional to the speed of said driving means.

9. In combination with a driving means and a source of unidirectional current, a first and second transducer as described in claim 1 mounted so said driving means revolves said first transducer shaft, said first transducer shaft coupled to said second transducer shaft, said second transducer angularly displaced with respect to said first transducer, first slip-ring of said first transducer connected to first output terminal of said unidirectional current source, first commutator contact spring of said second transducer connected to said first slip ring of said second transducer, first commutator contact spring of said second transducer connected to one end of a load, second output terminal of said unidirectional current source connected to the second terminal of said load, the resultant output being a series of rectangular pulses of a width dependent on said angular displacement between said transducers as initially mounted and of a frequency proportional to the speed of said driving means.

10. In combination with a driving means and a source of alternating current, a first and second transducer as described in claim 1 mounted so said driving means revolves said first transducer shaft, said first transducer shaft coupled to said second transducer shaft, said second tranducer angularly displaced with respect to said first transducer, first slip-ring of said first transducer connected to first output terminal of said alternating current source, first commutator contact spring of said first transducer connected to said first slip ring of said second transducer, first commutator contact spring of said second transducer connected to one end of a load, second output terminal of said alternating current source connected to the second terminal of said load, the resultant output being a series of alternating current bursts of a width dependent on said angular displacement between said transducers as initially mounted and at a repetition rate proportional to the speed of said driving means.

11. In combination with a source of unidirectional current and a driving means, a transducer comprising a tubular body with one end closed by a flange of a coaxial, outwardly projecting, cylindrical bushing surrounding a sleeve bearing in which a rotatable shaft is disposed so that one end of the shaft projects beyond the outer end of the bushing, the other end of said shaft, enclosed within the body cavity, has insulatingly mounted thereon first and second slip rings with a commutator axially disposed between them, alternate bars of the commutator integrally formed with said first slip ring, remaining bars integrally formed with said second slip ring, said bars of said adjacent commutators separated by a determined distance, a free end of a first cantilever spring making contact with and riding on the surface of said first slip ring, a free end of a second cantilever spring making contact with and riding on the surface of said second slip ring, said first and second cantilever springs connected to said unidirectional current source, a third cantilever spring making contact with a commutator bar, a fourth cantilever spring making contact with an adjacent commutator bar, points of contact of said third and said fourth contact springs being spaced 360° divided by the total number of commutator bars, the resulting current rectangularly-shaped and of a frequency proportional to speed of said driving means.

12. In combination with a source of unidirectional current and a driving means, a transducer comprising a tubular body with one end closed by a flange of a coaxial, outwardly projecting, cylindrical bushing surrounding a sleeve bearing in which a rotatable shaft is disposed so that one end of the shaft projects beyond the outer end of the bushing, the other end of said shaft, enclosed within the body cavity, has insulatingly mounted thereon first and second slip rings with a commutator axially disposed between them, alternate bars of the commutator integrally formed with said first slip ring, remaining bars integrally formed with said second slip ring, said bars of said adjacent commutators separated by a free end of a first cantilever spring making contact with and riding on the surface of said slip ring, free end of a second cantilever spring making contact with and riding on the surface of said second slip ring, said first and second cantilever springs connected to said unidirectional current source, a third cantilever spring making contact with a commutator bar and having a contact length sufficient to bridge said gap separating said adjacent commutators as said third cantilever spring passes over said gap, a fourth cantilever spring making contact with an adjacent commutator bar and having a contact length sufficient to bridge said gap separating said adjacent commutators as said fourth cantilever spring passes over said gap, points of contact of said third and said fourth contact springs being spaced 360° divided by the total number of commutator bars, the resulting current rectangularly-shaped and of a frequency proportional to speed of said driving means.

13. In combination with a source of unidirectional current and a driving means, a transducer comprising a tubular body with one end closed by a flange of a coaxial, outwardly projecting, cylindrical bushing surrounding a sleeve bearing in which a rotatable shaft is disposed so that one end of the shaft projects beyond the outer end of the bushing, the other end of said shaft, enclosed within the body cavity, has insulatingly mounted thereon first and second slip rings with a commutator axially disposed between them, alternate bars of the commutator integrally formed with said first slip ring and fabricated from a carbon-graphite material, remaining bars integrally formed with said second slip ring and fabricated from a carbon-graphite material, said bars of said adjacent commutators separated by a gap, free end of a first cantilever spring making contact with and riding on the surface of said first slip ring, free end of a second cantilever spring making contact with and riding on the surface of said second slip ring, said first and second cantilever springs connected to said unidirectional current source, a third cantilever spring making contact with a commutator bar and having a length sufficient to bridge said gap separating said adjacent commutators as said third cantilever spring passes over said gap, a fourth cantilever spring making contact with an adjacent commutator bar and having a length sufficient to bridge said gap separating said adjacent commutators as said fourth cantilver spring passes over said gap, points of contact of said third and said fourth contact springs being spaced 360° divided by the total number of commutator bars, the resulting current rectangularly-shaped and of a frequency proportional to speed of said driving means.

14. In combination with a source of unidirectional current and driving means, a transducer comprising a tubular body with one end closed by the flange of a coaxial, outwardly projecting, cylindrical bushing surrounding a sleeve bearing in which a rotatable shaft is disposed so that one end of said shaft projects beyond the outer end of said bushing, the other end of said shaft, enclosed within the body cavity, having insulatingly mounted thereon first and second slip rings with a commutator axially disposed between them, alternate bars of said commutator integrally formed with said first slip ring, remaining bars of said commutator integrally formed with said second slip ring, said bars of said adjacent commutators separated by a gap, a free end of said first cantilever spring making contact with and riding on the surface of said first slip ring, free end of said second cantilever spring making contact with and riding on the surface of said second slip ring, first and second cantilever springs connected to said unidirectional current source, third, fourth, and fifth cantilever springs contacting said commutator at points spaced 120° resulting in a quasi 3-phase rectangular-wave output of a frequency proportional to the speed of the aforementioned driving means.

15. In combination with a source of unidirectional current and driving means, a transducer comprising of a tubular body with one end closed by the flange of a coaxial, outwardly projecting, cylindrical bushing surrounding a sleeve bearing in which a rotatable shaft is disposed so that one end of said shaft projects beyond the outer end of said bushing, the other end of said shaft, enclosed within the body cavity, having insulatingly mounted thereon first and second slip rings with a commutator axially disposed between them, alternate bars of said commutator integrally formed with said first slip ring, remaining bars of said commutator integrally formed with said second slip ring, said bars of said adjacent commutators separated by a gap, a free end of said first cantilever spring making contact with and riding on the surface of said first slip ring, free end of said second cantilever spring making contact with and riding on the surface of said second slip ring, first and second cantilever springs connected to said unidirectional current source, third, fourth and fifth cantilever springs contacting said commutator at points spaced 120° resulting in a quasi 3-phase rectangular-wave output of a frequency proportional to the speed of the aforementioned driving means and said third, fourth and fifth cantilever springs having a contact length sufficient to bridge said gap separating said adjacent commutators as said springs pass over said gap.

References Cited

UNITED STATES PATENTS

| | | | |
|---|---|---|---|
| 1,306,923 | 6/1919 | Myers | 321—50 X |
| 2,090,010 | 8/1937 | Di Sabatino | 321—50 X |
| 2,831,154 | 4/1958 | Dudenhausen | 321—50 X |
| 3,206,667 | 9/1965 | Haase | 321—50 |

JOHN F. COUCH, *Primary Examiner.*

G. GOLDBERG, *Assistant Examiner.*